P. H. VANDER WEYDE.
GAS GENERATOR.
No. 62,095. Patented Feb. 12, 1867.
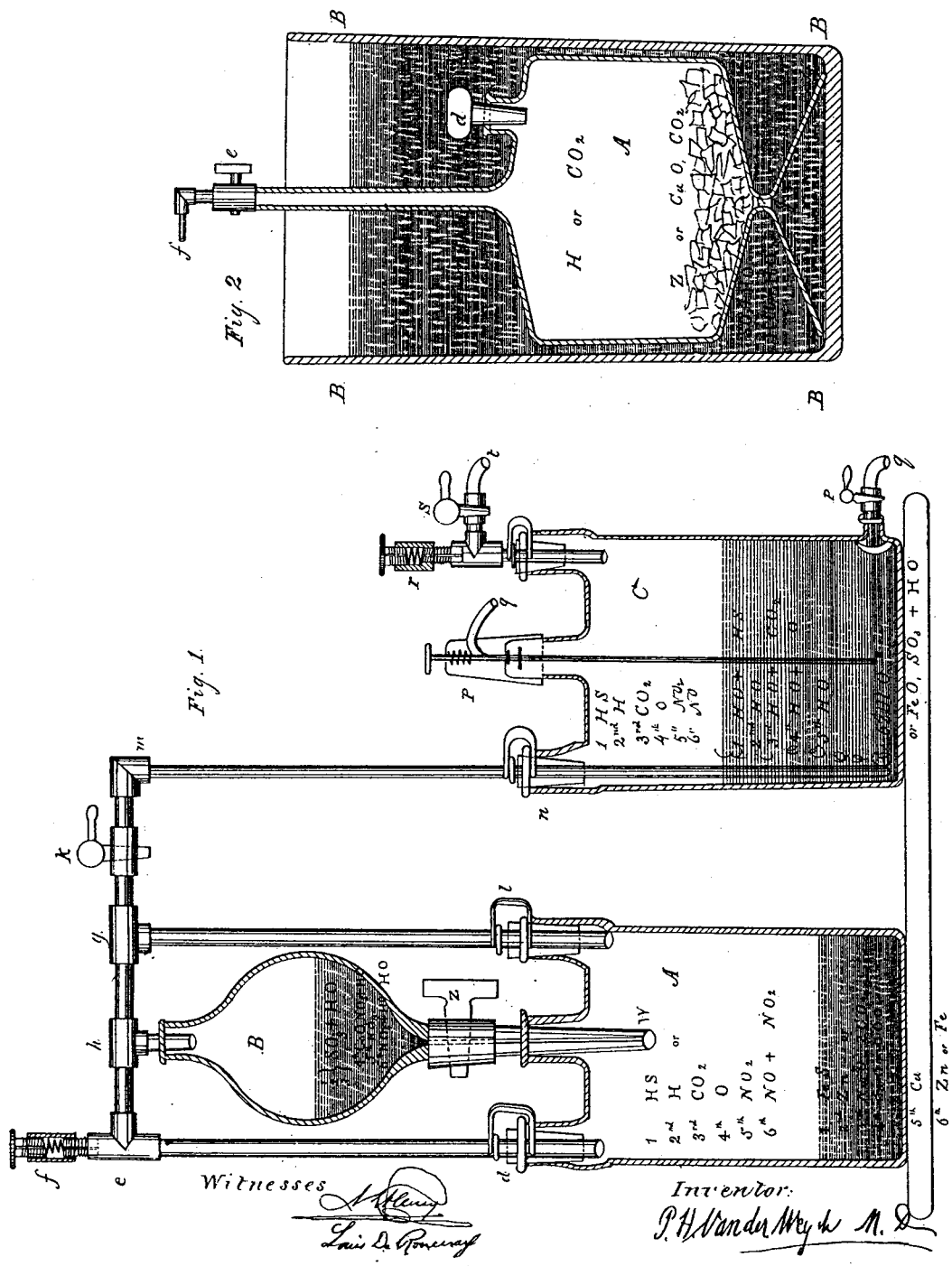

United States Patent Office.

P. H. VANDER WEYDE, OF PHILADELPHIA, PENNSYLVANIA.

Letters Patent No. 62,095, dated February 12, 1867; antedated January 30, 1867.

IMPROVEMENT IN GAS GENERATORS.

The Schedule referred to in these Letters Patent and making part of the same.

TO ALL WHOM IT MAY CONCERN:

Be it known that I, P. H. VANDER WEYDE, M. D., of the city and county of Philadelphia, State of Pennsylvania, have invented an Improvement in Gas Generators adapted to keep on hand a constant supply of hydrogen, carbonic acid, or sulphide of hydrogen, with strong or weak pressure; and I do hereby declare that the following is a full and exact description thereof, reference being had to the accompanying drawings.

The nature of my invention consists in two new arrangements, Figure 1 and Figure 2: the first to develop the said gases under pressure, the second to produce them under slight pressure. Both are chiefly made of glue, and adapted for the laboratory, medical use, or other purposes.

To enable others to make and use this invention, I will proceed to describe their construction and operation.

A, fig. 1, is the generator, and is simply a Wolfe bottle with three necks. In place of charging this apparatus at once with the substance from which the gas is to be developed, and placing a full dose of the acid in contact with it, as thus far was done in arrangements for this purpose, I keep those substances separate by placing the acid in a funnel-shaped and closed vessel, B, below provided with a stop-cock, which arrangement enables me to admit only so much acid at a time as gives a sufficient pressure for my purpose. As the pressure of gas in the lower vessel would prevent the acid from flowing out from the lower end of the funnel W, the upper part of the vessels A and B are connected with the tubes $d\ e\ g\ l$, securely fastened to the necks at $d$ and $l$, air-tight at the joints, and serving at the same time to keep the funnel B down, the connection at $h$ giving free communication to the air in both vessels. $f$ is a safety tube, and $k$ a stop-cock to admit the gas to the working bottle C, which, however, may be omitted if desired. In C the gas passes through water, and will charge this water with it. The water may be drawn off through $g$ by pressing the stop-cock $p$ in the usual style of the soda-water bottle, or the gas may be drawn off at $t$ by turning the stop-cock S. $r$ is another safety valve, of which the pressure is made less than the valve $f$ in case it is desired to saturate the water with gas.

First, To generate sulphide of hydrogen with this apparatus, we place sulphide of iron in the bottom of A, and, by turning the stop-cock Z, the diluted sulphuric acid from B will evolve from it the sulphide of hydrogen gas, which will pass in the water in C, saturate it, and give a supply of this water as well as the pure gas. When we require the sulphide of hydrogen and ammonia for chemical test, we may fill this bottle with liquid ammonia, or, what is better, attach a second similar bottle with this liquid. Second, when we wish to generate hydrogen gas, we place zinc and water in A, and the rest of the operation is the same. Third, when we desire to generate carbonic acid gas, we place bicarbonate of soda in A, and we will obtain in C carbonic acid water and carbonic acid gas under pressure, which is a great desideratum at present for surgical uses. Fourth, if we wish to generate oxygen, we place in A a clear solution of chloride of lime, and in B a solution of nitrate of cobalt. Fifth, if we wish to generate nitric oxide $NO_2$, and hyponitric acid $NO_4$, we place in A scraps of copper, and in B nitric acid. Nitric oxide $NO_2$ will first be developed, which in contact with the atmosphere will be changed into hyponitric acid $NO_4$. Sixth, if we wish to produce nitrous oxide NO, we place in A scraps of zinc or iron, and in B diluted nitric acid. A mixture of nitrous oxide and nitric oxide NO and $NO_2$ is produced, of which the last may also be changed into nitrous oxide N O by passing it in C over scraps of moistened lime, or through a solution of protosulphate of iron.

A, fig. 2, is only a modification of the inverted bell jar. It has a long neck to give place to the liquid ascending. It is contracted at C for the double purpose of having a support for the pieces of zinc or marble, and of exposing as little surface of liquid as possible to the contact of the gas, which, in case of carbonic acid generation, absorbs enormous quantities of it. B B B B is the glass vessel containing the acid, out of which the vessel A is lifted in order to introduce the pieces of zinc or marble by the neck $d$, which is provided with a tight-fitting stopper. By turning the stop-cock $e$ the air will escape by $f$, and the vessel A will fill with the diluted acid. By closing this stop-cock the gas generated will drive the acid out by $g$, till, when it is no more in contact with the solid substance in A, the evolution of gas ceases. The lower part has the shape of an inverted funnel, $h\ g\ h$, in order to collect all the gas evolved from small pieces of the solid which may accidentally fall through the opening $g$ to the bottom of the jar B B B. When using the last apparatus for the evolution of hydrogen, zinc and diluted sulphuric acid are used. When using it for carbonic acid, it is best to take pieces of marble or dolomite and hydrochloric acid, as the sulphuric acid forms with the lime a less soluble sulphate of lime, which coats the pieces and soon stops the operation.

What I claim as my invention, and wish to secure by Letters Patent, is—

1. A gas generator, when the acid is entirely separated from the substance from which the gas is evolved, brought in contact only in proportion to the pressure and quantity required, and adapted to the instantaneous generation, without the application of heat, of the following gases: hydrogen, oxygen, carbonic acid, hydrosulphric acid, sulphide of ammonia, nitric and nitrous oxide, and hyponitric acid.

2. The long-necked bell jar A, contracted and expanded below, as described above, preventing the absorption of the gas by the liquid.

In testimony whereof I have signed my name to this specification in the presence of two subscribing witnesses.

P. H. VANDER WEYDE.

Witnesses:
  A. M. FLEURY,
  LOUIS DE RINCENAY.